United States Patent [19]
Kim et al.

[11] Patent Number: 5,526,356
[45] Date of Patent: Jun. 11, 1996

[54] RING COMMUNICATION NETWORK NODE APPARATUS WITH BUFFERS AND METHOD FOR CONTROLLING THE SAME

[75] Inventors: Tae J. Kim; Won Ryu, both of Daejeon, Rep. of Korea

[73] Assignees: Electronics and Telecommunications Research Institute, Daejeon; Korea Telecommunication Autority, Seoul, both of Rep. of Korea

[21] Appl. No.: 352,094

[22] Filed: Nov. 30, 1994

[30] Foreign Application Priority Data

Feb. 8, 1994 [KR] Rep. of Korea .................. 1994-2468

[51] Int. Cl.$^6$ ............................................. H04L 12/42
[52] U.S. Cl. ..................... 370/85.150; 370/85.1; 370/85.2; 370/85.5; 340/825.05
[58] Field of Search ...................... 370/85.15, 85.2, 370/85.5, 94.1, 85.1; 340/825.05

[56] References Cited

U.S. PATENT DOCUMENTS

| | | | |
|---|---|---|---|
| 4,561,092 | 12/1985 | Shaver | 370/89 |
| 4,759,015 | 7/1988 | Takai et al. | 370/86 |
| 4,926,418 | 5/1990 | Cidon et al. | 370/85.5 |
| 4,949,336 | 8/1990 | Hamada et al. | 370/85.2 |
| 5,140,587 | 8/1992 | Mueller et al. | 370/85.15 |
| 5,245,605 | 9/1993 | Ofek | 370/85.12 |

OTHER PUBLICATIONS

Izhak Rubin et al., "FECCA—A New Access Algorithm for an ATM Ring Network with Destination Removal", pp. 368–375.

Israel Cidon et al., "MetaRing—A Full-Duplex Ring with Fairness and Spatial Reuse", *IEEE Transactions on Communications*, vol. 41, No. 1, Jan. 1993, pp. 110–120.

*Primary Examiner*—Douglas W. Olms
*Assistant Examiner*—Melissa Kay Carman
*Attorney, Agent, or Firm*—Spencer & Frank

[57] ABSTRACT

A node apparatus of such a ring communication network including buffers capable of improving a performance of the ring communication network and yet maintaining a global fairness in use of a ring communication network bandwidth among nodes, and a method for controlling the node apparatus. The node apparatus includes a receiver unit for receiving packets and slots from a ring, an ordering buffering unit for ordering the packets, a receiving queuing unit for temporarily storing messages of the packets to be sent to a host, a trunk buffering unit for temporarily storing packets to be transmitted to other nodes and then relaying the stored packets, a transmitting queuing unit for storing messages to be transmitted to the ring, and a transmitter unit for transmitting packets and messages in a medium access control manner. The control method includes the first step of checking about a destination node for a packet received to a node, the second step of processing the packet when the destination node corresponds to the packet-received node, the third step of processing the packet in a manner different from the second step when the destination node corresponds to a node other than the packet-received node, the fourth step of processing the packet at an empty state and the fifth step of processing the packet at a seizure state.

9 Claims, 12 Drawing Sheets

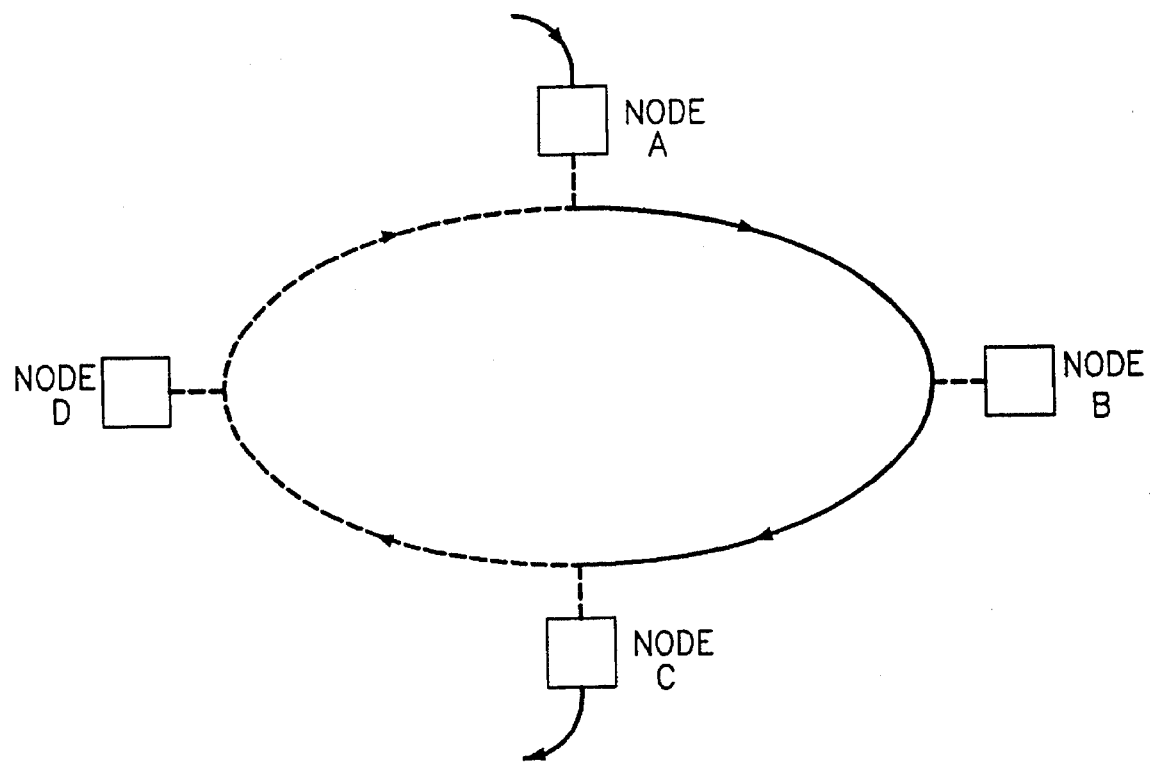
FIG. 1
CONVENTIONAL

FIG. 2
CONVENTIONAL
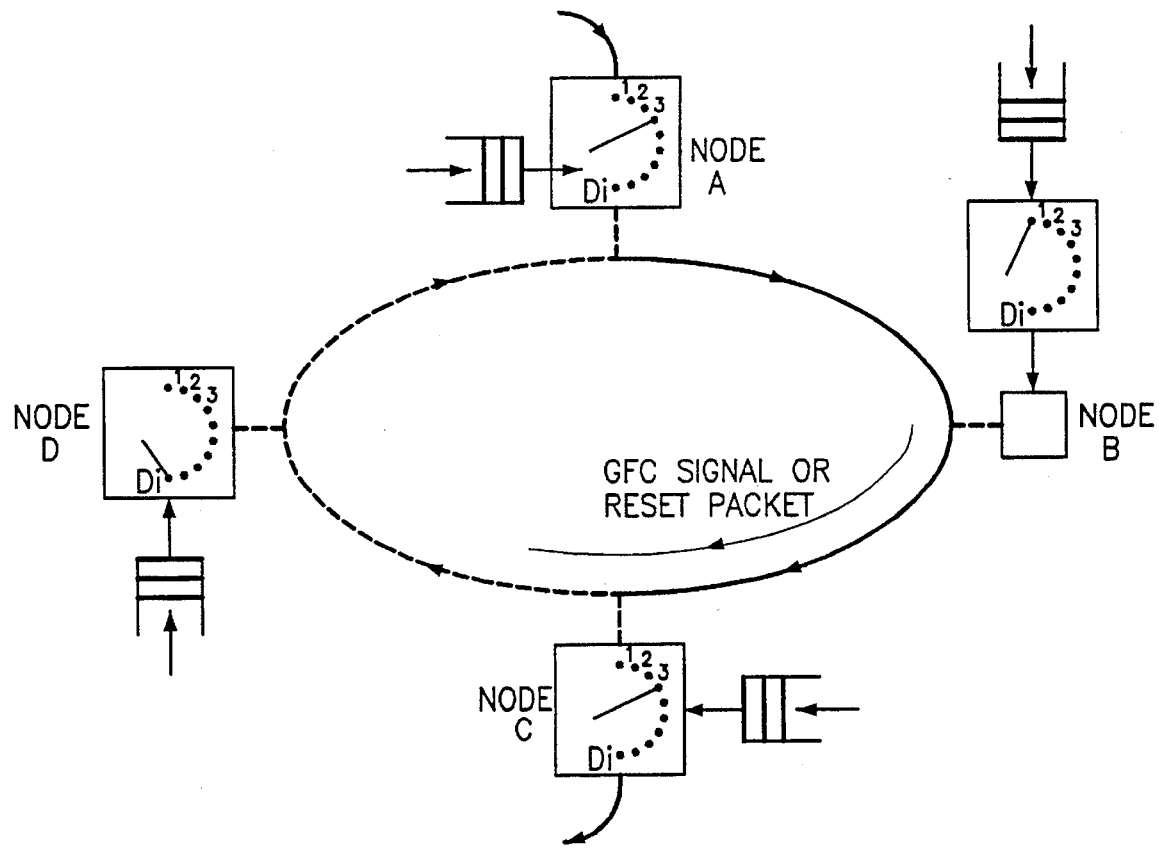

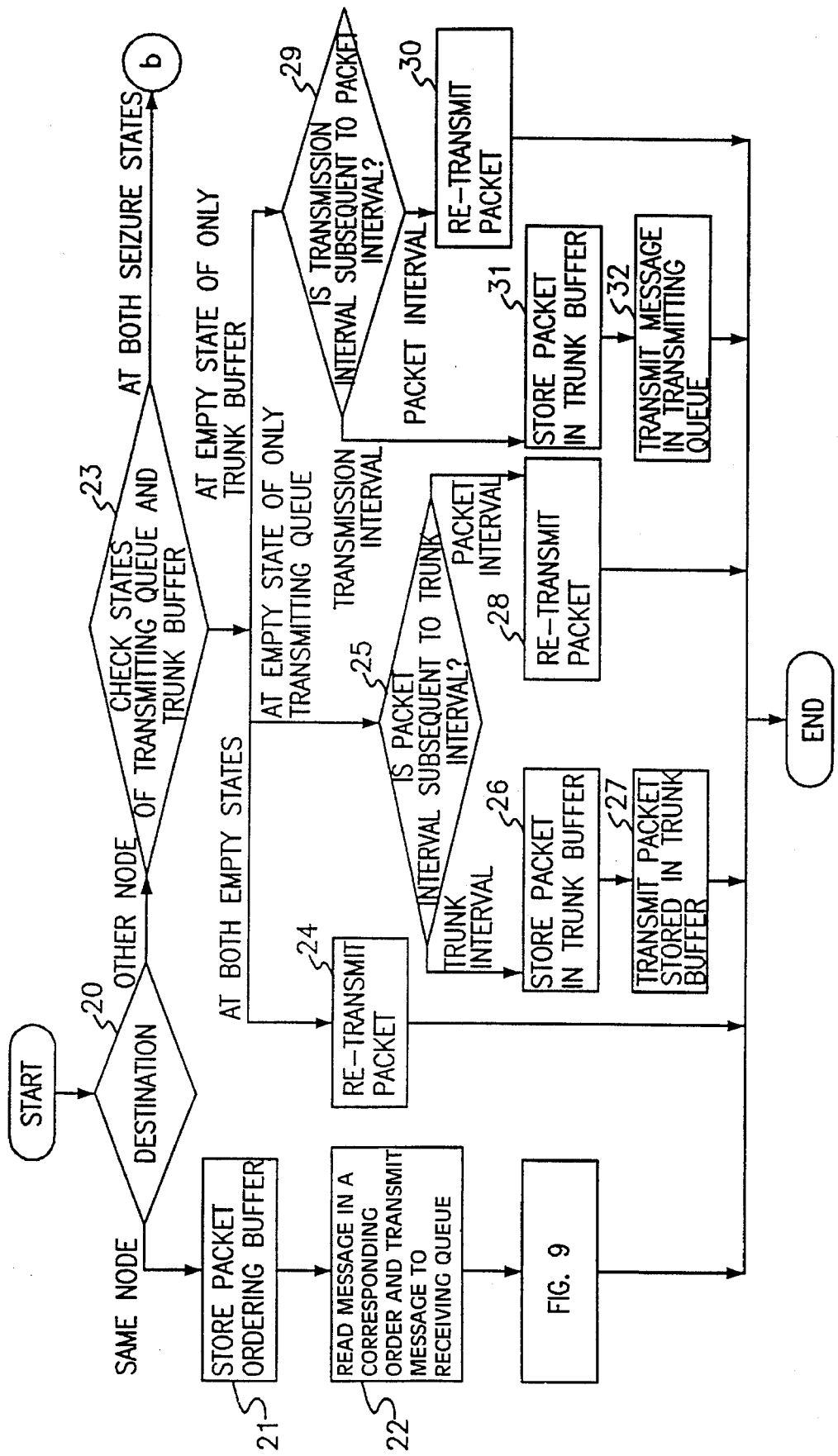

RING COMMUNICATION NETWORK NODE APPARATUS WITH BUFFERS AND METHOD FOR CONTROLLING THE SAME

BACKGROUND OF THE INVENTION

1. Field of the Invention

The present invention relates to a ring communication network wherein packets are erased at destination nodes, and more particularly to a node apparatus of such a ring communication network including buffers capable of improving performance of the ring communication network while maintaining a global fairness in use of ring communication network bandwidth among nodes, and a method for controlling the same.

2. Description of the Prior Art

In a ring communication network adapted to erase packets transmitted from originating nodes, the propagation delay of the packets may be relatively longer than the delivery time of packet data itself as the ring has a more rapid processing rate and a larger size. As a result, the ring communication network is degraded in performance.

In order to solve such a problem, there has been proposed a system for removing each of the transmitted packets at a corresponding destination node. In a ring communication network employing such a system, spatial reuse of bandwidth is possible. In other words, a waste bandwidth to be generated between each destination node and each corresponding originating node can be reused by erasing a packet and transmitting a new packet at the destination node. Accordingly, an increase in effective communication network bandwidth may be obtained even by the same ring construction. Where destination nodes respectively corresponding to packets are uniformly distributed, the mean packet transportation distance corresponds to ½ of the total ring length. Accordingly, it is possible to obtain a transportation processing capability doubling that of a ring communication network employing a system for erasing packets at originating nodes. In the case of the ring communication network employing the system for erasing packets at destination nodes, however, downstream ones among overload nodes are difficult to access by the communication network. In other words, a bandwidth starvation phenomenon occurs. In the case illustrated in FIG. 1, for example, when messages from a node A are continuously transmitted to a destination node C under a condition that nodes C and D have no message to be transmitted, a node B can not transmit any message to be sent.

For this reason, it is necessary to implement a global fairness control (GFC) enabling all nodes to use the communication network bandwidth fairly. This GFC is performed in response to a hardware GFC signal circulating the ring or a reset packet generated when all nodes have completely used the bandwidth allocated thereto or have no packet to be transmitted, and adapted to allow all nodes to use a bandwidth re-allocated. By the GFC, all nodes are ensured to use the ring communication network bandwidth fairly. For example, in a case illustrated in FIG. 2, each node is ensured to use an allocation amount of Di for a GFC interval.

Due to such a GFC, however, a loss of ring communication network bandwidth is generated. Such a loss of ring communication network bandwidth is caused by a bandwidth used by the reset packet itself or the GFC signal or by a self transmission control feature of nodes where the nodes do not transmit any packets so as to ensure the GFC even under a situation where they are allowed to use the communication network. Since the loss of bandwidth caused by the GFC signal or the reset packet itself is very small and required to achieve the GFC, it is unavoidable. However, the loss of usable bandwidth caused by the limited packet transmission of nodes may be eliminated.

Conventionally, there has also been a proposal wherein the GFC interval is lengthened to reduce the relative loss of communication network bandwidth. However, this method has a limitation on the reduction because it causes another problem of increasing a packet delivery delay time. Also, there has been a proposal that the packet allocation amount transmissible within the GFC signal interval ranges between a minimum value and a maximum value, thereby obtaining a slight increase in processing capability. However, this method also has the problem of increasing the packet delivery delay time. Recently, there has been also a proposal for using a waste ring bandwidth in order to reduce the loss of bandwidth caused by the self transmission control feature of nodes. This method enables a packet transmission when there is a packet to be transmitted even after the allocated bandwidth is completely used in a double ring having control packet circulating in a direction opposite a packet transmission direction in so far as an empty ring path is defined between the node to transmit the packet and a destination node for the packet, that is, there is no node to transmit the packet. However, the waste ring bandwidth can not be used when the ring path is empty only between the node to transmit the packet and an optional midway. Furthermore, this method involves a slight increase in GFC interval, thereby causing the packet delivery delay time to increase. Also, the method can not be applied to a single ring.

As apparent from the above description, conventional methods include the method of erasing packets at destination nodes, the method of ensuring a global fairness among nodes by use of a satisfaction control signal and the method of increasing the communication processing amount by an allocation of the minimum number of packets and the maximum number of packets transmissible between successive GFC signals. In accordance with these conventional methods, however, a node which has completely transmitted a packet allocation amount for a current GFC signal interval is not permitted to transmit any packet until a next GFC signal interval is begun. As a result, a loss of ring communication processing capability is generated.

SUMMARY OF THE INVENTION

Therefore, an object of the invention is to solve the above-mentioned problems encountered in the prior art and, thus, to provide a node apparatus for a ring communication network capable of allowing a node, which has completely transmitted its allocation amount in a current interval, to transmit packets to be transmitted in future intervals as additional packets in the current interval, thereby using a waste resource of the ring communication network, that is, an apparatus capable of improving the performance of the ring communication network, wherein packets are erased at destination nodes, while maintaining a global fairness in the use of the ring communication network bandwidth among nodes, and to provide a method for controlling the same.

In accordance with one aspect, the present invention provides a node apparatus for a ring communication network comprising: receiver means for receiving packets and slots from a ring; ordering buffering means for ordering the packets disorderly received from the receiver means; receiving queuing means for temporarily storing messages of the packets ordered by the ordering buffering means so as to send the messages to a host; trunk buffering means for temporarily storing packets to be transmitted from the receiver means to other nodes and then relaying the stored packets, the trunk buffering means having a predetermined trunk interval; transmitting queuing means for storing messages to be transmitted from the host to the ring, the transmitting queuing means having a predetermined transmission interval; and transmitter means for transmitting packets directly delivered from the receiver means, the packets stored in the trunk buffering means and the messages stored in the transmitting queuing means in a medium access control manner.

In accordance with another aspect, the present invention provides a method for controlling a ring communication network node apparatus including receiver means, ordering buffering means, receiving queuing means, trunk buffering means, transmitting queuing means and transmitter means, comprising the steps of: (A) when a node receives a seizure slot transporting a packet, checking about a destination node for the packet; (B) when the checked destination node has been determined at the step (A) to correspond to the node that has received the packet, storing the packet in the ordering buffering means, reading a message of the packet in accordance with an order assigned thereto, erasing the packet, and then executing an empty slot receiving and processing procedure; (C) when the checked destination node has been determined at the step (A) to correspond to a node other than the packet-received node, checking about a state of the transmitting queuing means and a state of the trunk buffering means; (D) when both the transmitting queuing means and the trunk buffering means have been determined at the step (C) to be at an empty state, transmitting the received packet depending on the empty state of each of the transmitting queuing means and the trunk buffering means; and (E) when both the transmitting queuing means and the trunk buffering means have been determined at the step (C) to be at a seizure state, transmitting the received packet depending on a most subsequent one of a packet interval, a trunk interval and a transmission interval.

BRIEF DESCRIPTION OF THE DRAWINGS

Other objects and aspects of the invention will become apparent from the following description of embodiments with reference to the accompanying drawings in which:

FIG. 1 is a schematic view explaining a bandwidth starvation phenomenon occurring in a conventional ring communication network;

FIG. 2 is a schematic view explaining a GFC system employed in the conventional ring communication network;

FIGS. 8A and 8B are flow charts respectively illustrating a seizure slot receiving procedure in accordance with the present invention;

DETAILED DESCRIPTION OF THE PREFERRED EMBODIMENTS

Figure 3:
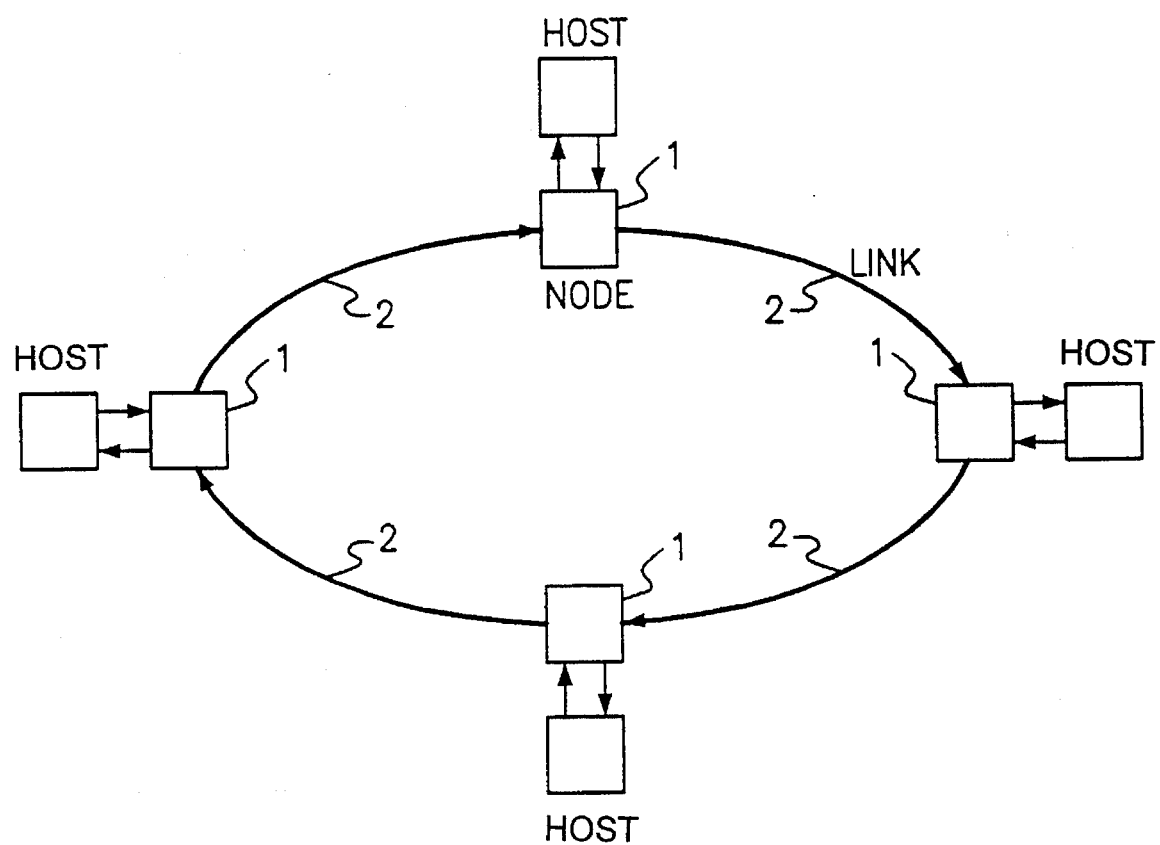
FIG. 3 is a schematic view illustrating a ring communication network to which the present invention is applied.

FIG. 3 is a schematic view illustrating a ring communication network to which the present invention is applied. As shown in FIG. 3, the ring communication network includes nodes 1 each adapted to receive a message from a host to be transmitted, format the received message in the form of packets, and transmit the packets to a ring. On the other hand, each node 1 also serves to receive a packet from another host via the ring, extract a message from the received packet and deliver the message to the host thereof. Adjacent nodes 1 are connected to each other via a link 2 to from the ring. The ring serves to deliver packets and transport a GFC signal. The ring communication network to which the present invention is applied may have either a single ring type or a double ring type. Since the same system is employed in both cases of the single ring type and the double ring type, the following description will be made only in conjunction with the single ring type.

The present invention provides a more sure scheme wherein even a node completing transmission for all messages allocated during a current GFC control interval can transmit a message standby at a transmitting queue to be transmitted in a next GFC interval by re-using an empty slot irrespective of a destination node for the standby message. In accordance with this scheme, each node can always transmit an additional packet (namely, a packet of messages to be sent in a next GFC interval) irrespective of position of a destination node for the packet and state of downstream nodes even though it has used the bandwidth re-allocated. In place, a node maintained at a bandwidth starvation state intercepts the additional packet on the slot during the travel of the slot, stores the additional packet temporarily in its trunk buffer, transports the message standby at its transmitting queue by the slot, and then forwards the intercepted additional packet after a recovery from the bandwidth starvation state. Even in a case of additional packets originated at the same node, however, the order of their delivery may be unobserved as the additional packets are stored individually in trunk buffers corresponding to destination nodes thereof and then forward-delivered individually. That is, the scheme may encounter a problem that an ordered delivery of additional packets is not ensured. This problem can be solved by providing ordering buffers ensuring an ordered delivery of packets at nodes, respectively. In other words, the present invention enables the reuse of a waste bandwidth caused by the self transmission control feature of nodes with the provision of trunk buffers at respective nodes and the solution to a disordered transportation of packets to destination nodes by the provision of ordering buffers.

Figure 4:
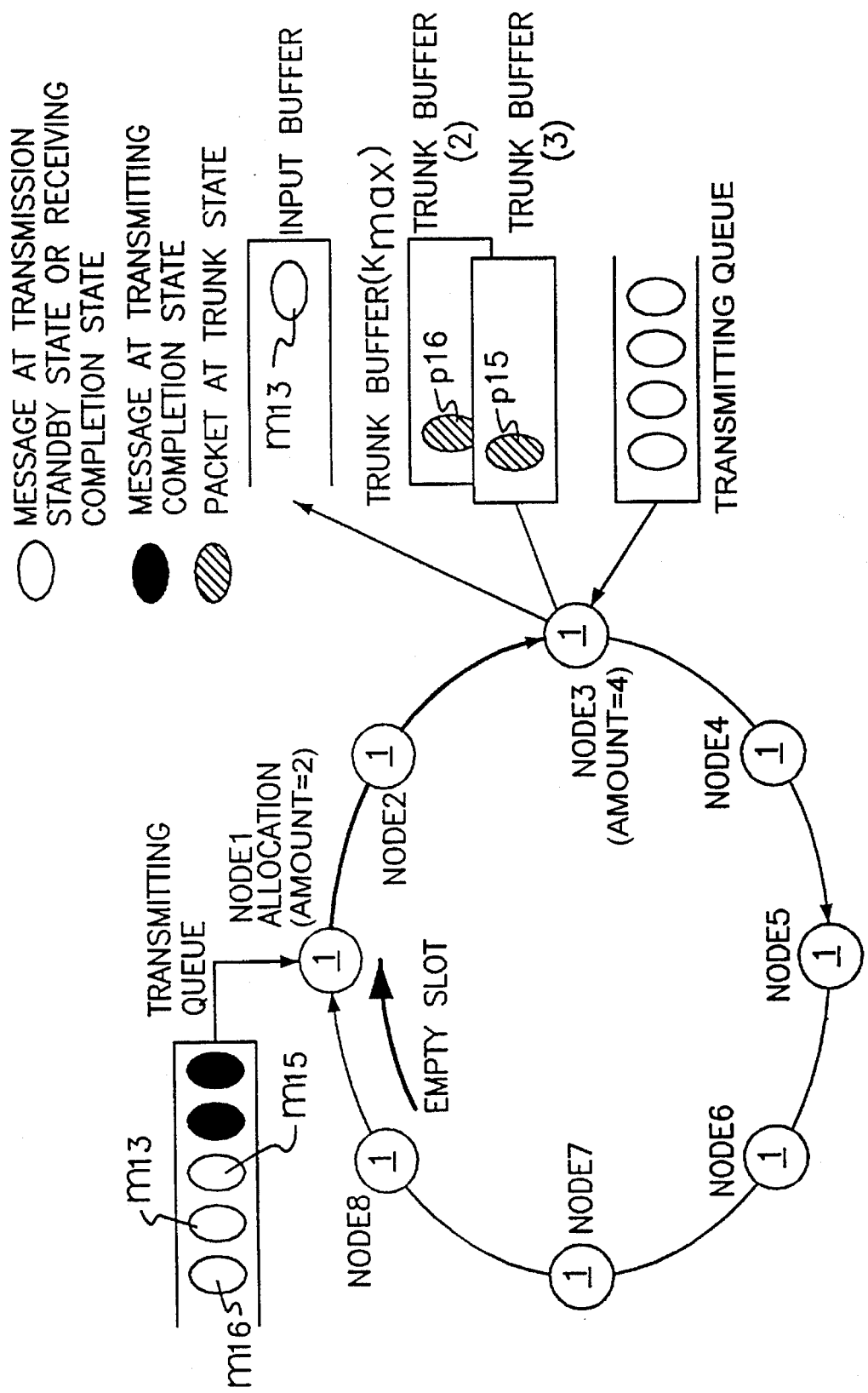
FIG. 4 is a schematic view explaining a function of trunk buffers.

FIG. 4 is a schematic view explaining a function of trunk buffers provided at nodes.

In the illustrated case, a first node which is maintained under a condition that two messages corresponding to an allocation amount of the first node have been transmitted has messages m15 and m13 to be transmitted in a next interval and a message m16 to be transmitted in the interval after next (packets of such messages are called "additional packets"). Here, "mij" means a message to be transmitted from an originating node i to a terminating node j, while "pij" means a packet to be transmitted from the originating node i to the terminating node j. When the first node receives an empty slot or a packet destined for the first node under a condition that a second node has no message to be transmitted while a third node is ready for a transmission of four messages corresponding to a current allocation amount thereof, it formats the message m15 stored in its transmitting queue in the form of a packet and then transmits the packet. At this time, a header of the packet carries packet interval data (=1) which is an information that the corresponding message is a message to be transmitted in the next interval. The third node checks a destination node for a packet received therein. Where the packet received in the third node is destined to a node other than the third node, the third node stores the received packet in its corresponding trunk buffer, for example, a first trunk buffer and transmits a message to be transmitted in the current interval in place of the received packet. In the case of the message m13, the third node stores the message m13 in its input buffer because the message m13 is destined to the third node. On the other hand, the third node stores the message m16 in its trunk buffer, for example, a second trunk buffer and transmits its message because the message m16 is a message to be transmitted in the interval after next. A packet pij is a packet corresponding to the message mij. As a path 13 (extending from the first node to the third node) corresponding to a waste bandwidth is reused to transmit earlier a message to be transmitted in the next interval in a manner as mentioned above, it is possible to obtain a bandwidth gain of at least six slot-hops. Here, the "slot-hop" is defined by a bandwidth at which each slot passes between adjacent nodes, that is, transports a packet.

Thus, most of the waste empty slots may be reused. As a result, the slot reuse rate is correspondingly increased while the interval duration is shortened. Consequently, an enhancement in performance of the ring communication network is obtained.

Figure 5:
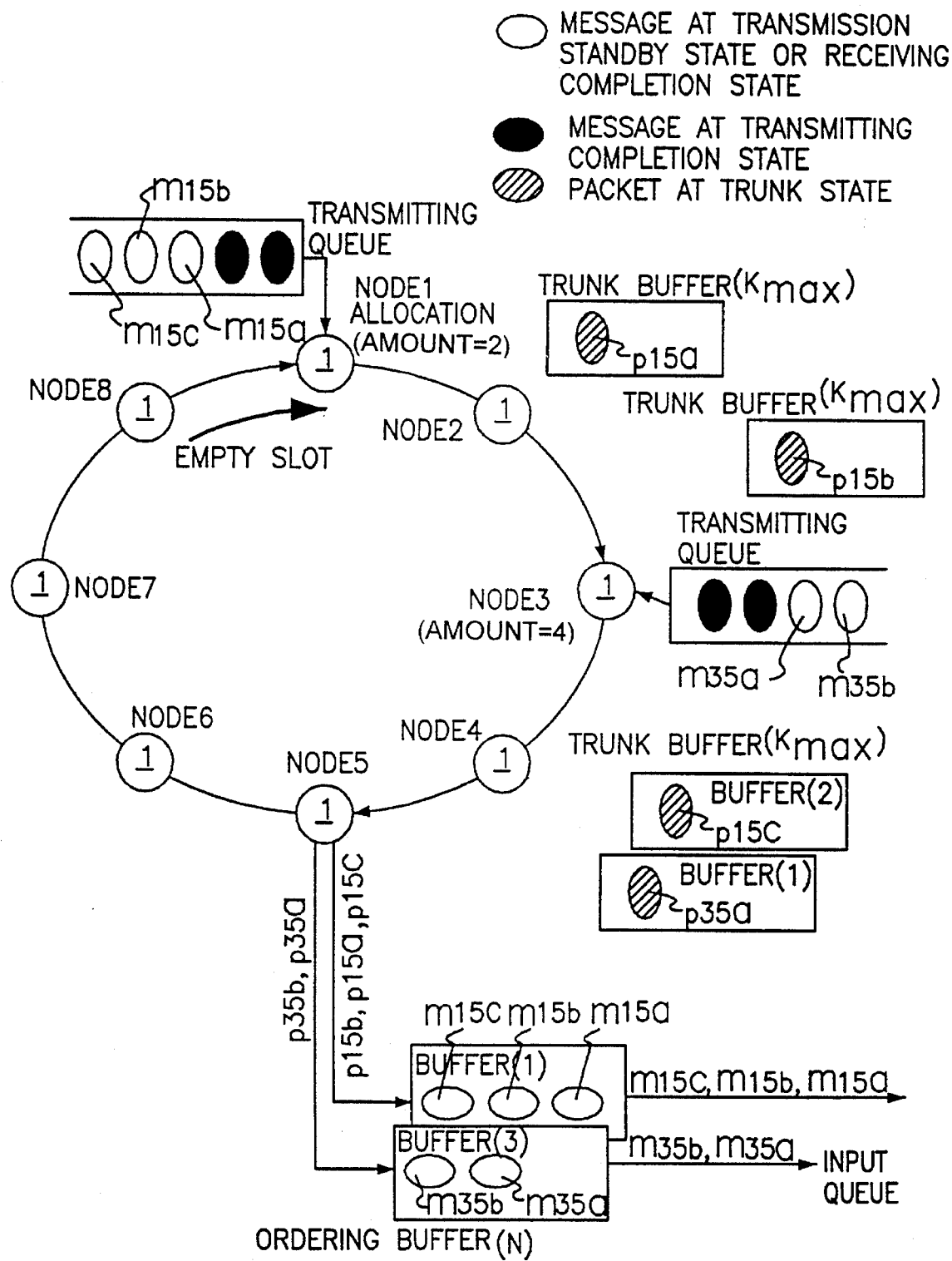
FIG. 5 is a schematic view explaining a function of ordering buffers.

FIG. 5 is a schematic view explaining a function of ordering buffers.

Where the first node has messages m15a, m15b and m15c over its allocation amount while the third node has messages m35a and m35b over its allocated amount, the messages are to be transmitted using waste slots in a manner as described in conjunction with FIG. 4. In this case, packets p15a, p15b, p15c are temporarily stored in the trunk buffer of the second node, the trunk buffer of the third node and a second trunk buffer of a fourth node, respectively. On the other hand, a packet p35a is temporarily stored in a first trunk buffer of the fourth node. Thereafter, each of the packets is continuously transported using an empty slot until an interval associated therewith completes and are finally received in a fifth node which is a terminating node for the packet. In this case, the packets originated at the first node may be inputted in a disordered manner, for example, in the order of p15b, p15a and p15c. Similarly, the packets originated at the third node may be also inputted in a disordered manner, for example, in the order of p35b and p35a. Such a disorder of packets is corrected by storing each packet in an ordering buffer corresponding to both the originating node of the packet and the order number of the packet. In case of a message mijk, "i" means the originating node number, "j" the terminating node number and "k" the order number. A packet pijk is a packet corresponding to the message mijk.

Figure 6:
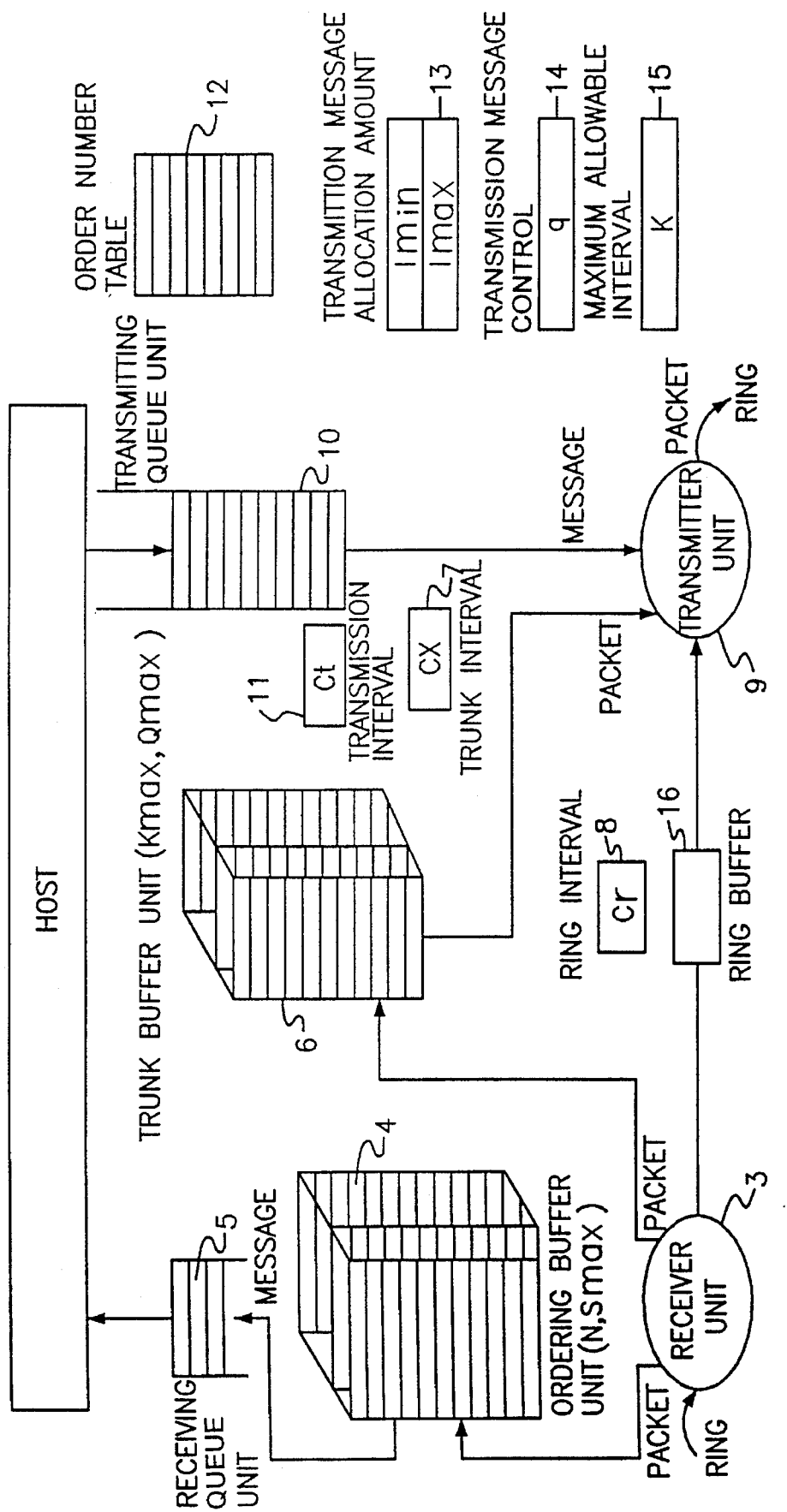
FIG. 6 is a block diagram illustrating a node apparatus in accordance with the present invention.

FIG. 6 is a block diagram illustrating a node apparatus in accordance with the present invention. As shown in FIG. 6, the node apparatus includes a packet receiver unit 3 for receiving and processing a packet from a ring, namely a packet synchronously transported by a seizure slot in a synchronous manner in a case of the slot ring, and in an asynchronous manner in the case of a buffer insertion ring, an ordering buffer unit (N,Smax) 4 for adjusting the order of packets disorderly input, a receiving queue unit 5 for sending ordered messages (not including a packet head carrying a packet interval and an order number) to a host, and a trunk buffer unit (Kmax,Qmax) 6 for temporarily storing packets each destined to a node, other than a packet-received node and transporting them after the storing. The node apparatus further includes a transmitting queue unit 10 for storing a message to be transmitted from the host to the ring, a transmitter unit 9 for transmitting a packet directly transmitted from the receiver unit 3, a packet stored in the trunk buffer unit 6 and a message stored in the transmitting queue unit 10, to the ring in a medium access control manner, and a ring buffer 16 for temporarily storing packets to be transmitted to other nodes just after being received in the ring buffer 16 during a transmission of messages stored in the transmitting queue unit 10. Various information to be utilized for the medium access control is stored in a node. The node stores an order number table (N) 12 adapted to be used for formatting messages in the form of packets, a transmission message allocation amount 13, a transmission message count 14, a ring interval 8, and a maximum allowable interval 15. In the trunk buffer unit 6, a trunk interval 7 is stored. In the transmitting queue unit 10, a transmission interval 11 is stored. The ring buffer 16 is used only when the ring communication network operates in a ring buffer mode. The ring buffer 16 is not used when the ring communication network operates in a slot mode. The ordering buffer unit 4 includes a plurality of buffers adapted to store Smax messages for each of N nodes. Here, "N" is the total number of nodes provided whereas "Smax" means the maximum number of ordered messages allocated to each node. Each of the packets destined to the same node is stored in an ordering buffer (n,s) corresponding to both the originating node number n thereof and the order number s thereof. Although packets bearing the same originating node number may be input in a disordered manner, they are read in the order of order numbers assigned thereto after being stored in corresponding ordering buffers. Since the packets are delivered to the receiving queue unit 5 under the above-mentioned condition, the ordering thereof is achieved. The maximum order number Smax corresponds to the maximum allocation amount lmax of messages transmissible in each interval. Accordingly, packets bearing both the same originating node address and the same terminating node address are ordered by order numbers respectively assigned thereto. The maximum allowable interval number Kmax is defined by the maximum one of interval differences each between a current GFC interval and a maximum future transmission interval each allowing transmission of additional messages without any limitation in a current GFC interval duration for each node. Each of the interval differences is called a maximum allowable interval K for each node. Assuming that K and lmax for an optional node are 3 and 2, respectively, the node can transmit six (3×2=6) additional messages maximum without any limitation.

The trunk buffer unit 6 includes a plurality of trunk buffers adapted to store Qmax packets ("Qmax" represents the maximum number of messages transmissible in each interval and is defined by the multiplication of the node number N by the maximum transmission allocation amount lmax) for each interval of the maximum allowable interval number Kmax. By this construction of the trunk buffer unit 6, each packet to be transmitted respectively to another node after being temporarily stored is stored in a corresponding trunk buffer (k) corresponding to an interval k thereof in a sequential manner. The ring interval number 8 is indicative of the value of the current GFC interval so that it is used as a reference for the GFC. The ring interval number 8 is incremented every time when a GFC signal or a reset packet is received. The trunk interval number 7 is indicative of the value k of a trunk buffer (k,) which stores a packet to be transmitted in an interval earlier than those of other trunk buffers. The trunk interval number 7 is used in the transmitter unit 9. The transmission interval number 11 is indicative of an interval value of a message to be currently transmitted. The transmission interval number 11 is not more than the maximum allowable interval Kmax. The order number table 12 includes order number values respectively required for formatting messages to be transmitted in the form of packets. The order number values of the order number table 12 are managed in terms of destination node. The order number is incremented every time when formatting of a message in the form of a packet is executed. The transmission message allocation amount 13 is indicative of the number of messages which the transmitting queue unit 10 of each node is allowed to transmit in one interval. Here, lmax and lmin represent maximum and minimum value of the transmission message allocation amount, respectively. The transmission message count 14 is indicative of the number of messages transmitted in a current transmission interval.

Figure 7:
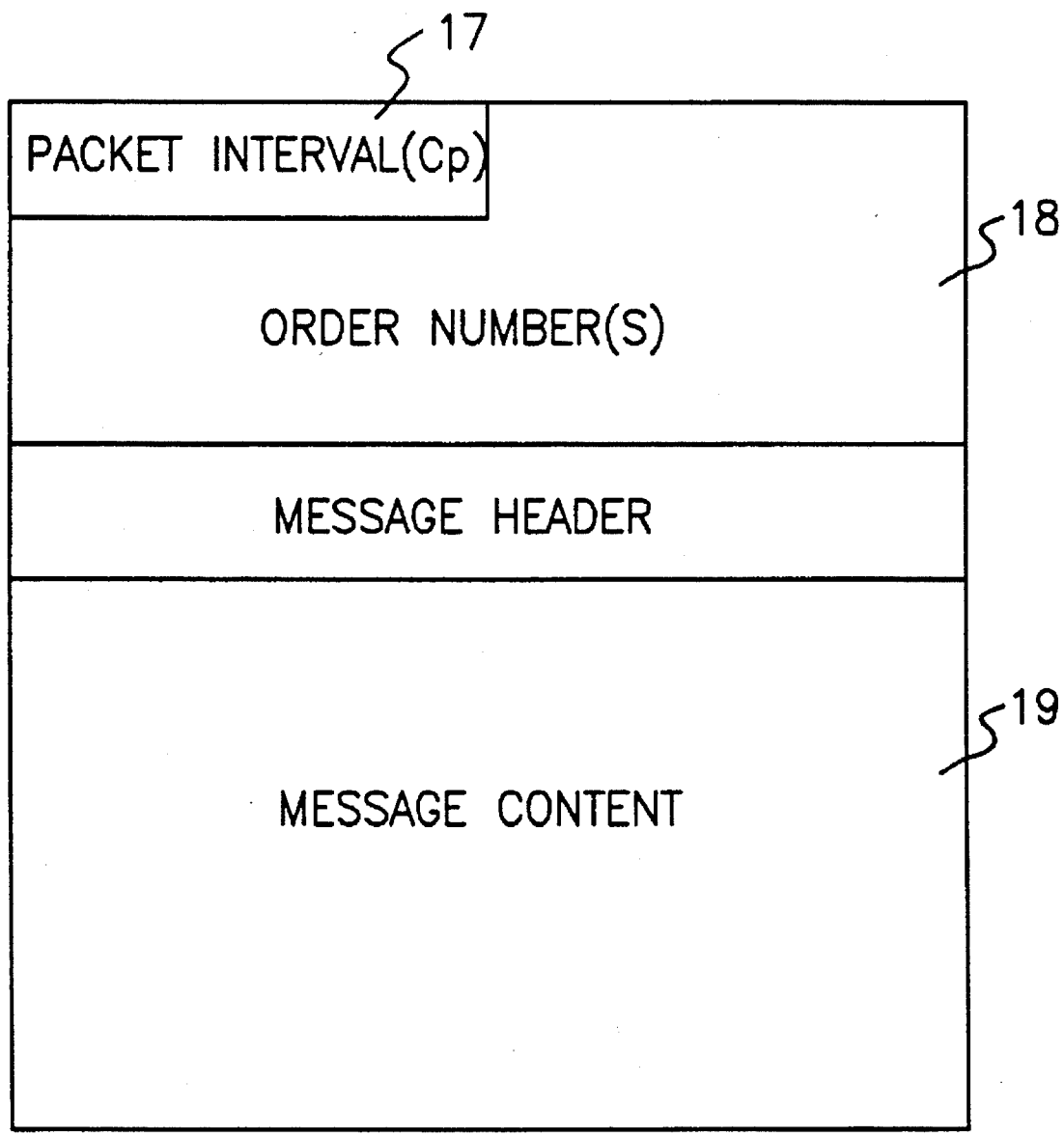
FIG. 7 is a schematic view illustrating a format of a packet in accordance with the present invention.

FIG. 7 is a schematic view illustrating a format of a packet in accordance with the present invention. As shown in FIG. 7, the packet includes a packet header provided with a packet interval 17 and an order number 18, and a message.

The packet interval 17 and the order number 18 are values stored upon formatting a message in the form of the packet at an originating node for the packet, respectively. The packet interval 17 and the order number 18 represent a transmission interval value 11 of the originating node and an order number corresponding to a destination node for the message to be transmitted respectively. The message part of the packet has a message header and a message content 19. The message header must bear an originating node address and a terminating node address. Since the node apparatus of the present invention may be employed in an existing ring communication network, the message header may be varied depending on the existing ring communication network.

FIGS. 8A to 12 illustrate a medium access control method in accordance with the present invention.

The method of the present invention may be applied to any ring communication network of the slot ring type, the buffer ring type, etc., in so far as they are constructed to erase a packet at a destination. For simplicity of description, the method of the present invention will be described only in conjunction with a ring communication network of the slot ring type most commonly used.

Figure 8B:
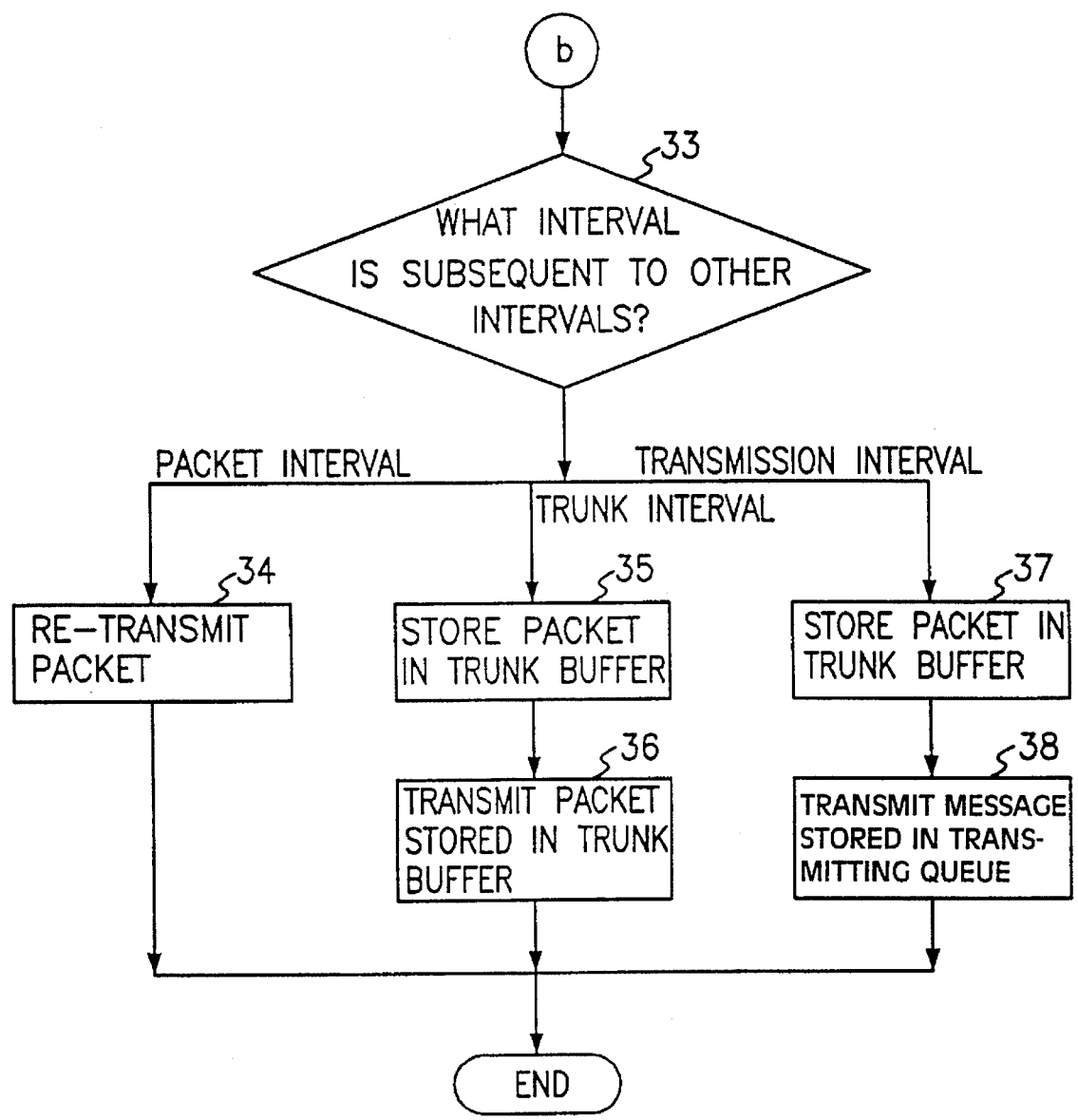

FIGS. 8A and 8B are flow charts respectively illustrating a seizure slot receiving procedure in accordance with the present invention. The seizure slot receiving procedure will now be described in conjunction with FIGS. 8A and 8B.

Figure 9:
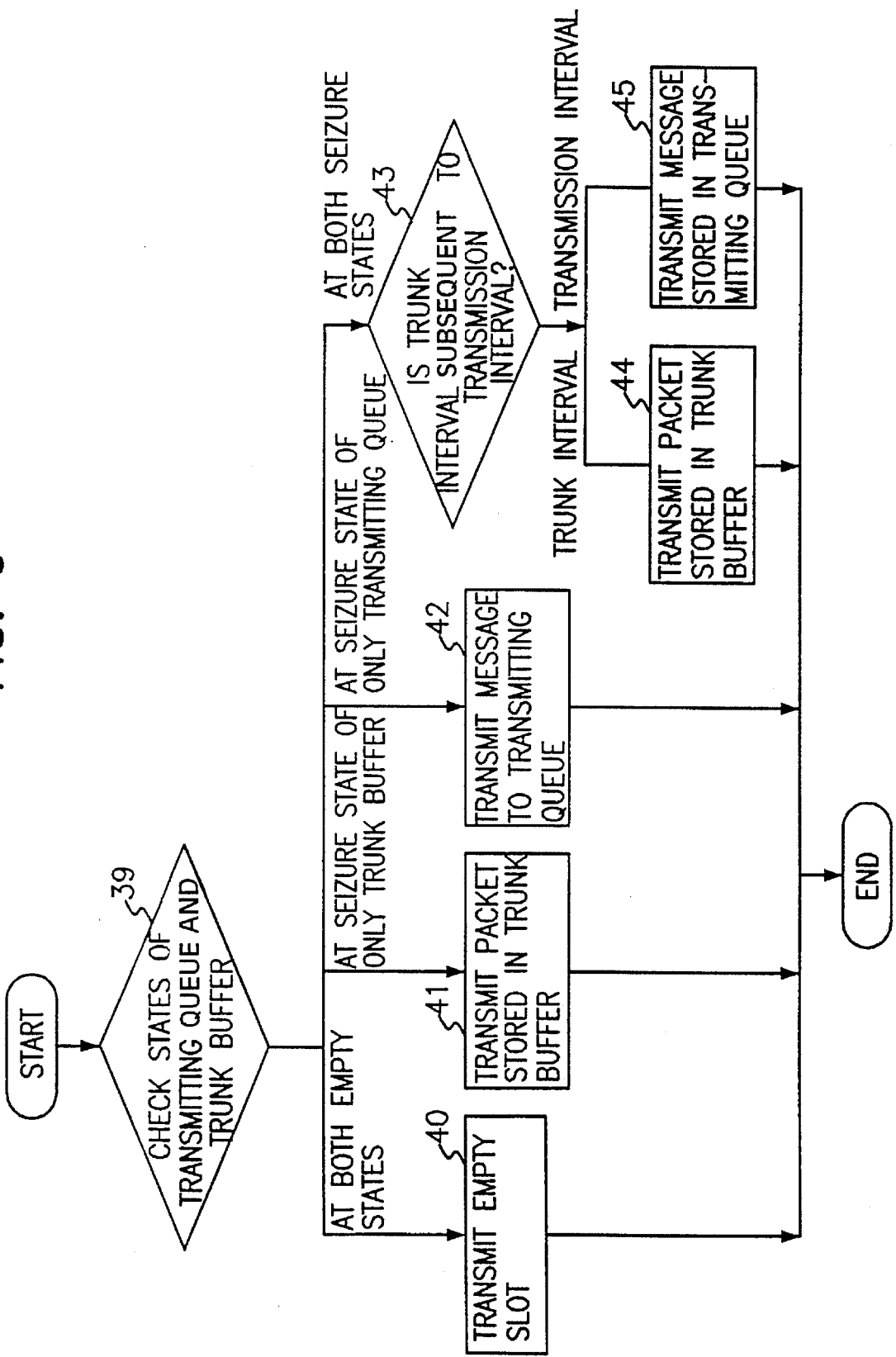
FIG. 9 is a flow chart illustrating the empty slot receiving and processing procedure in accordance with the present invention.

When a node receives a seizure slot transporting a packet, a check is made about a destination node for the packet by reading the destination node in the message header of the packet (Step 20). Where the checked destination node corresponds to the node that has received the packet, the packet is stored in a corresponding ordering buffer (n,s) determined in accordance with its originating node number n and its order numbers (Step 21). The message of the packet is then read in accordance with an order assigned thereto so that it is inputted in the receiving queue units (Step 22). Thereafter, the packet is erased. Under this condition, an empty slot receiving and processing procedure is executed, which is shown in FIG. 9. Where the checked destination node corresponds to a node other than the node that has received the packet, a check is made about a state of the transmitting queue unit 10 and a state of the trunk buffer unit 6 (Step 23). When both the transmitting queue unit 10 and the trunk buffer unit 6 are at an empty state, that is, they have no data to be transmitted, the received packet is re-transmitted from the packet-received node (Step 24). When only the transmitting queue unit 10 is at its empty state, the packet interval 17 of the received packet is compared with the trunk interval 7 of the packet-received node (Step 25). Where the trunk interval 7 is subsequent to the packet interval 17, the packet is stored in a trunk buffer (Cp,) corresponding to the packet interval Cp of the packet in accordance with the order assigned thereto (Step 26). A packet stored in a trunk buffer (Cx,) corresponding to the trunk interval Cx is then transmitted in accordance with the same order as the storing order (Step 27). If there is no packet in the trunk buffer (Cx,) after the transmission, a re-adjustment of the trunk buffer (Cx,) is executed. When the packet interval 17 is subsequent to the trunk interval 7, the received packet is re-transmitted (Step 28). Where only the trunk buffer unit 6 is at its empty state, the packet interval is compared with the transmission interval of the packet-received node (Step 29). When the transmission interval Ct 11 is subsequent to the packet interval 17, the packet is stored in the trunk buffer (Cp,). Subsequently, a message stored in the transmitting queue unit 10 is transmitted in the form of a packet (Step 32). When the packet interval 17 is subsequent to the transmission interval 11, the received packet is re-transmitted (Step 30). On the other hand, where both the transmitting queue unit 10 and the trunk buffer unit 6 have data to be transmitted (SEIZURE STATE), a comparison is made among the packet interval Cp 17, the trunk interval Cx 7 and the transmission interval Ct 11 (Step 33, FIG. 8B). When the packet interval Cp 17 is subsequent to other intervals, the received packet is re-transmitted (Step 34). When the trunk interval Cx 7 is subsequent to other intervals, the received packet is stored in the trunk buffer (Cp,) (Step 35). In this case, a packet in a trunk buffer (Cx,) corresponding to the trunk interval Cx 7 is then transmitted (Step 36). On the other hand, when the transmission interval Ct 11 is subsequent to other intervals, the received packet is stored in the trunk buffer (Cp,) (Step 37). In this case, a message stored in the transmitting queue unit 10 is then transmitted (Step 38).

FIG. 9 is a flow chart illustrating the empty slot receiving and processing procedure in accordance with the present invention. The empty slot receiving and processing procedure will now be described in conjunction with FIG. 9.

When a node has received an empty slot, or when the node has erased a packet destined thereto after processing the packet, a check is first made about a state of the transmitting queue unit 10 and a state of the trunk buffer unit 6 (Step 39). Where both the transmitting queue unit 10 and the trunk buffer unit 6 have no data to be transmitted, the empty slot is transmitted from the node (Step 40). Where only the trunk buffer unit 6 has packets to be transmitted, a packet stored in a trunk buffer (Cx,) corresponding to the trunk interval Cx 7 is transmitted (Step 41). When the trunk buffer (Cx,) no longer has any packet to be transmitted, the trunk interval Cx 7 is adjusted. Where only the transmitting queue unit 10 has messages to be transmitted, a message corresponding to the transmission interval Ct 11 is transmitted (Step 42). Where both the transmitting queue unit 10 and the trunk buffer unit 6 have data to be transmitted, the transmission interval Ct 11 is compared with the trunk interval Cx 7 (Step 43). If the trunk interval Cx 7 is subsequent to the transmission interval Ct 11, a packet stored in the trunk buffer (Cx,) is transmitted. If not, a message stored in the transmitting queue unit 10 is transmitted (Step 45).

Figure 10:
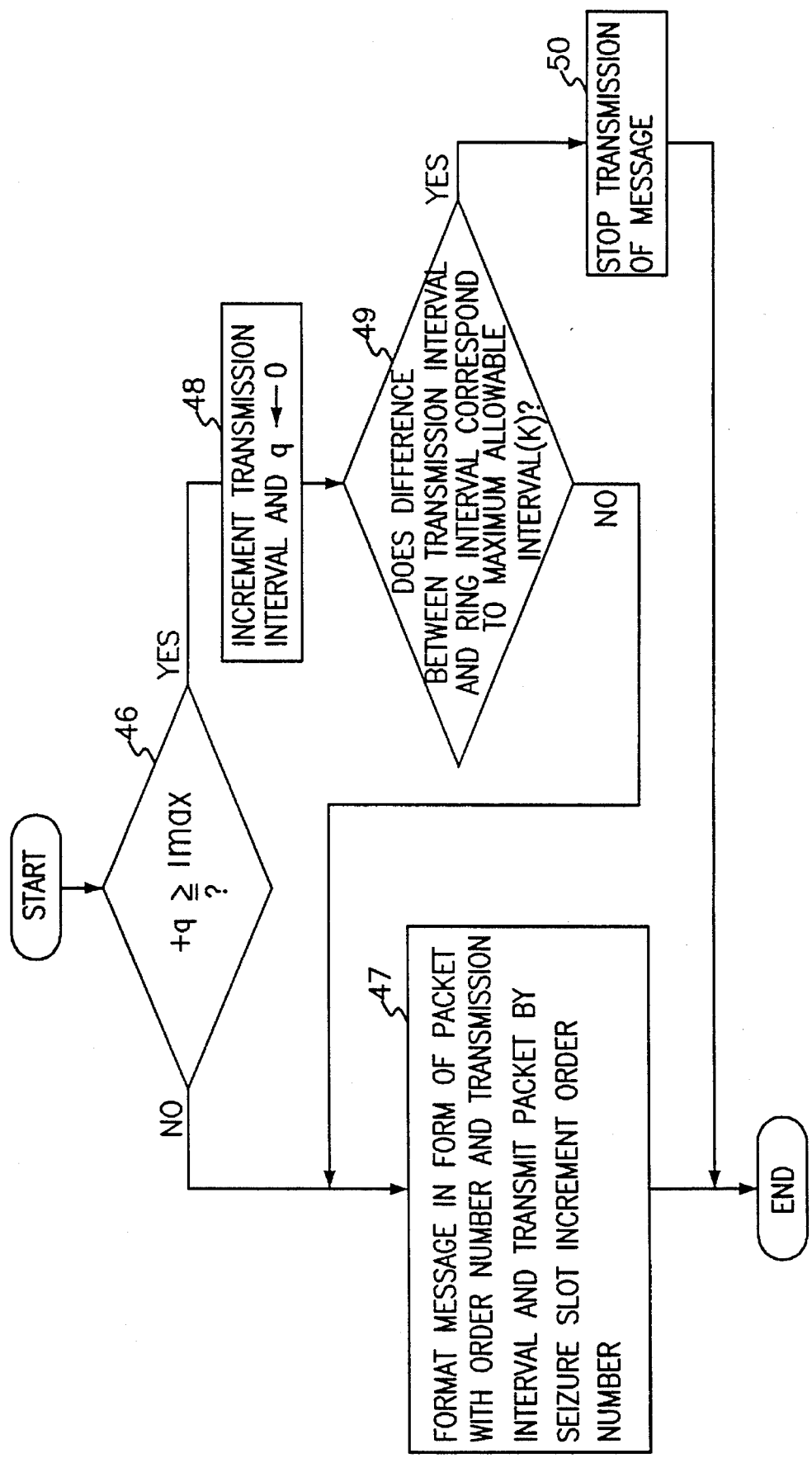
FIG. 10 is a flow chart illustrating a procedure for transmitting and processing a message stored in the transmitting queue unit in accordance with the present invention.

FIG. 10 is a flow chart illustrating a procedure for transmitting and processing a message stored in the transmitting queue unit 10 in accordance with the present invention. The message transmitting and processing procedure will now be described in conjunction with FIG. 10.

First, a transmission message count q is incremented and then compared with a maximum transmission message allocation amount lmax (Step 46). When the transmission message count q is less than the maximum transmission message allocation amount lmax, a message is formatted in the form of packet with an order number stored in the order number table 12 corresponding to the destination node and the transmission interval 11. Thereafter, the packet is transmitted to the ring by seizure slot, respectively. After the transmission of packet, corresponding order number is incremented (Step 47). When the transmission message count q is not less than the maximum transmission message allocation amount lmax, the transmission interval 11 is incremented and the transmission message count q is set by zero (Step 48). Thereafter, a check is made about whether a difference between the transmission interval 11 and the ring interval 8 corresponds to the maximum allowable interval K (Step 49). When the interval difference has reached the maximum allowable interval K, the transmission of message is stopped (Step 50). When the interval difference has not reached the maximum allowable interval K yet, the step 47 is executed, as previously described.

Figure 11:
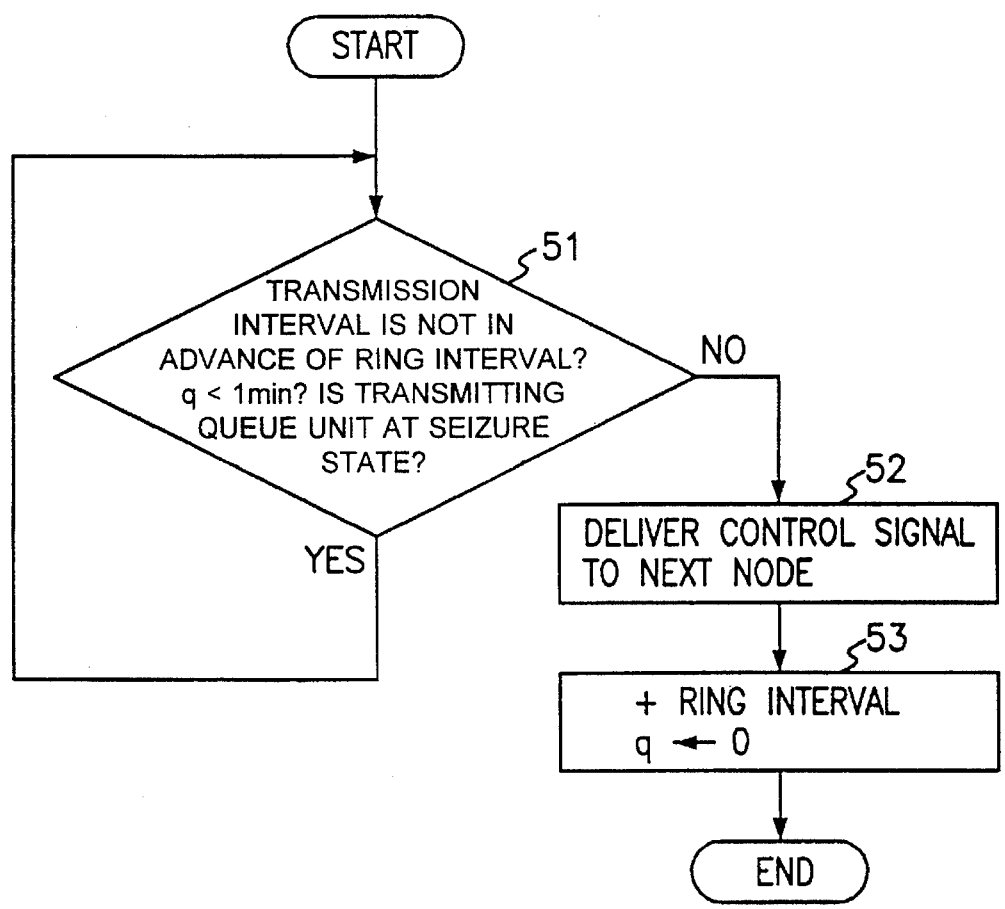
FIG. 11 is a flow chart illustrating a procedure for receiving and processing a GFC signal in accordance with the present invention.

FIG. 11 is a flow chart illustrating a procedure for receiving and processing a GFC signal in accordance with the present invention. Once this procedure is executed, a determination is made about whether the transmission interval Ct 11 is not in advance of the ring interval Cr 8, whether the transmission message count q is less than the minimum transmission allocation amount lmin and whether the transmitting queue unit 10 has at least one packet to be transmitted (SEIZURE STATE). If these conditions are satisfied, no control signal is generated (Step 51). If not, a control signal is delivered to a next node (Step 52). Thereafter, the ring interval Cr 8 is incremented while the transmission message count q is set to zero (Step 53).

Figure 12:
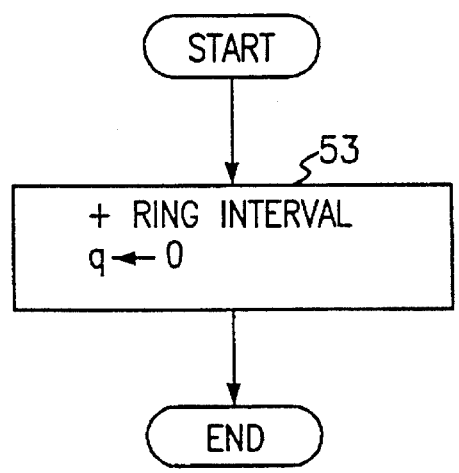
FIG. 12 is a flow chart illustrating a procedure for receiving and processing a GFC reset packet in accordance with the present invention.

FIG. 12 is a flow chart illustrating a procedure for receiving and processing a GFC reset packet in accordance with the present invention. Once this procedure is executed, the ring interval 8 is incremented while the transmission message count q is set to zero.

As apparent from the above description, the present invention enables waste empty slots caused by the GFC to be used maximally. By use of the waste empty slots, messages to be transmitted in next GFC intervals can be transmitted earlier. As a result, the GFC interval duration is shortened. This enables a great improvement in communication processing capability of the ring communication network and a reduction in packet delivery delay time. Since the present invention can be applied to the single ring type as well as the double ring type, the ring communication network to which the present invention is applied can be easily constructed. Moreover, the present invention provides an advantage that the ring communication network can cope efficiently with a variation in external load because the maximum allowable interval value is appropriately allocated to each node depending on the load condition of the node. Since the node apparatus of the present invention can be added to nodes of existing ring communication networks of the slot type, the buffer type and the token passing type, all adapted to erase packets at destination nodes, it is also used for an improvement in performance of the existing ring communication networks.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A node apparatus for a ring communication network comprising:

receiver means for receiving packets and slots from a ring;

ordering buffering means for ordering the packets disorderly received from the receiver means;

receiving queuing means for temporarily storing messages of the packets ordered by the ordering buffering means so as to send the messages to a host;

trunk buffering means for temporarily storing packets to be transmitted from the receiver means to other nodes and then relaying the stored packets, the trunk buffering means having a predetermined trunk interval;

transmitting queuing means for storing messages to be transmitted from the host to the ring, the transmitting queuing means having a predetermined transmission interval; and transmitter means for transmitting to the ring in a medium access control manner:
   packets directly delivered from the receiver means,
   the packets stored in the trunk buffering means, and
   the messages stored in the transmitting queuing means.

2. A node apparatus in accordance with claim 1, further comprising ring buffering means which, when the ring communication network operates in a ring buffer mode, is for temporarily storing the packets to be directly transmitted from the receiver means to the transmitter means, wherein the ring buffering means has a predetermined ring interval.

3. A method for controlling a ring communication network node apparatus including receiver means, ordering buffering means, receiving queuing means, trunk buffering means, transmitting queuing means and transmitter means, the method comprising the steps of:

(A) when a node receives a seizure slot transporting a packet, determining a destination node for the packet;

(B) when the destination node has been determined in the step (A) to correspond to the node that has received the packet, storing the packet in the ordering buffering means, reading a message of the packet in accordance with an order assigned thereto, erasing the packet, and then executing an empty slot receiving and processing procedure;

(C) when the destination node has been determined in the step (A) to correspond to a node other than the node that has received the packet, determining a state of the transmitting queuing means and a state of the trunk buffering means;

(D) when at least one of the transmitting queuing means and the trunk buffering means have been determined in the step (C) to be in an empty state, transmitting the received packet depending on the empty state of each of the transmitting queuing means and the trunk buffering means; and (E) when both the transmitting queuing means and the trunk buffering means have been determined in the step (C) to be in a seizure state, determining which of a packet interval, a trunk interval and a transmission interval is most subsequent, and transmitting the received packet depending on which is most subsequent.

4. A method in accordance with claim 3, wherein the empty slot receiving and processing procedure in the step (B) comprises the steps of:

(a) determining a state of the transmitting queuing means and a state of the trunk buffering means;

(b) when both the transmitting queuing means and the trunk buffering means have been determined in the step (a) to be in an empty state, transmitting an empty slot;

(c) when only the trunk buffering means has been determined in the step (a) to be in a seizure state, transmitting a packet stored in the trunk buffering means;

(d) when only the transmitting queuing means has been determined in the step (a) to be in a seizure state, transmitting a message stored in the transmitting queuing means; and (e) when both the transmitting queuing means and the trunk buffering means have been determined in the step (a) to be in the seizure state, comparing a transmission interval and a trunk interval, and transmitting a packet stored in the trunk buffering means if the trunk interval is subsequent to the transmission interval while transmitting a message stored in the transmitting queuing means if the transmission interval is subsequent to the trunk interval.

5. A method in accordance with claim 3, wherein the step (D) comprises the steps of:

(a) when both the transmitting queuing means and the trunk buffering means are in the empty state, re-transmitting the received packet;

(b) when only the transmitting queuing means is in the empty state, comparing a packet interval of the received packet with a trunk interval, and storing the received packet in the trunk buffering means and transmitting a packet stored in the trunk buffering means if the trunk interval is subsequent to the packet interval; and (c) when only the trunk buffering means is in the empty state, comparing the packet interval with a transmission interval, and storing the received packet in the trunk buffering means and transmitting a message stored in the transmitting queuing means if the transmission interval is subsequent to the packet interval while re-transmitting the received packet if the packet interval is subsequent to the transmission interval.

6. A method in accordance with claim 3, wherein the step (E) comprises the steps of:

(a) comparing the packet interval with both the trunk interval and the transmission interval;

(b) when the packet interval has been determined in the step (a) to be subsequent to other intervals, re-transmitting the received packet;

(c) when the trunk interval has been determined in the step (a) to be subsequent to other intervals, storing the received packet in the trunk buffering means and transmitting a packet stored in the trunk buffering means; and (d) when the transmission interval has been determined in the step (a) to be subsequent to other intervals, storing the received packet in the trunk buffering means and transmitting a message stored in the transmitting queuing means.

7. A method in accordance with claim 4, wherein the step of transmitting the message stored in the transmitting queuing means comprises the steps of:

(a) incrementing a transmission message count and comparing the incremented transmission message count with a maximum transmission message allocation amount;

(b) when the transmission message count has been determined in the step (a) to be less than the maximum transmission message allocation amount, formatting the message in the form of a packet with an order number stored in an order number table corresponding to a destination node for the message and the transmission interval, transmitting the packet to a ring by a seizure slot carrying the packet, and executing an increment in order number; and (c) when the transmission message count has been determined in the step (a) not to be less than the maximum transmission message allocation amount, incrementing the transmission interval and setting the transmission message count by zero, checking whether a difference between the transmission and a ring interval has reached a maximum allowable interval, and formatting the message in the form of a packet with the order number stored in an order number table corresponding to the destination node for the message and the transmission interval, transmitting the packet to the ring by the seizure slot carrying the packet and executing an increment in order number if the interval difference has not reached the maximum allowable interval yet, while stopping the transmission of the message if the interval difference has reached the maximum allowable interval.

8. A method in accordance with claim 5, wherein the step of transmitting the message stored in the transmitting queuing means comprises the steps of:

(a) incrementing a transmission message count and comparing the incremented transmission message count with a maximum transmission message allocation amount;

(b) when the transmission message count has been determined in the step (a) to be less than the maximum transmission message allocation amount, formatting the message in the form of a packet with an order number stored in an order number table corresponding to a destination node for the message and the transmission interval, transmitting the packet to a ring by a seizure slot carrying the packet, and executing an increment in order number; and (c) when the transmission message count has been determined in the step (a) not to be less than the maximum transmission message allocation amount, incrementing the transmission interval and setting the transmission message count by zero, checking whether a difference between the transmission and a ring interval has reached a maximum allowable interval, and formatting the message in the form of a packet with the order number stored in an order number table corresponding to the destination node for the message and the transmission interval, transmitting the packet to the ring by the seizure slot carrying the packet and executing an increment in order number if the interval difference has not reached the maximum allowable interval yet, while stopping the transmission of the message if the interval difference has reached the maximum allowable interval.

9. A method in accordance with claim 6, wherein the step of transmitting the message stored in the transmitting queuing means comprises the steps of:

(a) incrementing a transmission message count and comparing the incremented transmission message count with a maximum transmission message allocation amount;

(b) when the transmission message count has been determined in the step (a) to be less than the maximum transmission message allocation amount, formatting the message in the form of a packet with an order number stored in an order number table corresponding to a destination node for the message and the transmission interval, transmitting the packet to a ring by a seizure slot carrying the packet, and executing an increment in order number; and (c) when the transmission message count has been determined in the step (a) not to be less than the maximum transmission message allocation amount, incrementing the transmission interval and setting the transmission message count by zero, checking whether a difference between the transmission and a ring interval has reached a maximum allowable interval, and formatting the message in the form of a packet with the order number stored in an order number table corresponding to the destination node for the message and the transmission interval, transmitting the packet to the ring by the seizure slot carrying the packet and executing an increment in order number if the interval difference has not reached the maximum allowable interval yet, while stopping the transmission of the message if the interval difference has reached the maximum allowable interval.

\* \* \* \* \*